March 30, 1937.  J. W. DAWSON  2,075,098
METERING SYSTEM
Filed May 19, 1934  2 Sheets-Sheet 1

WITNESSES:
C. J. Weller.
R R Lockwood

INVENTOR
John W. Dawson.
BY
M. Crawford
ATTORNEY

March 30, 1937.　　J. W. DAWSON　　2,075,098
METERING SYSTEM
Filed May 19, 1934　　2 Sheets-Sheet 2

WITNESSES:
C. J. Weller.
R. R. Lockwood

INVENTOR
John W. Dawson.
ATTORNEY

Patented Mar. 30, 1937

2,075,098

UNITED STATES PATENT OFFICE 2,075,098

METERING SYSTEM

John W. Dawson, Wilkinsburg, Pa., assignor to Westinghouse Electric & Manufacturing Company, East Pittsburgh, Pa., a corporation of Pennsylvania Application May 19, 1934, Serial No. 726,563

7 Claims. (Cl. 177—351)

My invention relates, generally, to electrical measuring devices and it has particular relation to devices for metering quantities at a remote point.

In the prior art, various systems have been proposed employing the well known Kelvin balance for indicating at a remote point, variations in a quantity which it is desired to measure. In general, these systems have comprised some means for making and breaking contact members in accordance with variations in the quantity being measured which, in turn, complete circuits for effecting a restoration of the balance which was destroyed due to the variations in the quantity being measured. Necessarily, these systems operate somewhat discontinuously and are, therefore, subject to the objection that inaccurate indications may be transmitted and further that slight changes may not be indicated at all.

The object of my invention, generally stated, is to provide a remote metering system which shall be simple, efficient and accurate in operation and which may be readily and economically manufactured and installed.

The principal object of my invention is to provide for indicating, at a remote point, variations in a quantity being measured.

An important object of my invention is to provide for continuously transmitting to a remote point variations in a quantity being measured.

Another object of my invention is to provide for compensating for or counterbalancing the increasingly effective forces applied when a metering device organized in accordance with my invention is operated from a normal position.

Other objects of my invention will, in part, be obvious and, in part, appear hereinafter.

My invention accordingly is disclosed in the embodiment hereof shown in the accompanying drawings and comprises the features of construction, combination of elements, and arrangement of parts which will be exemplified in the construction hereinafter set forth and the scope of the application of which will be indicated in the appended claims.

Figure 1:
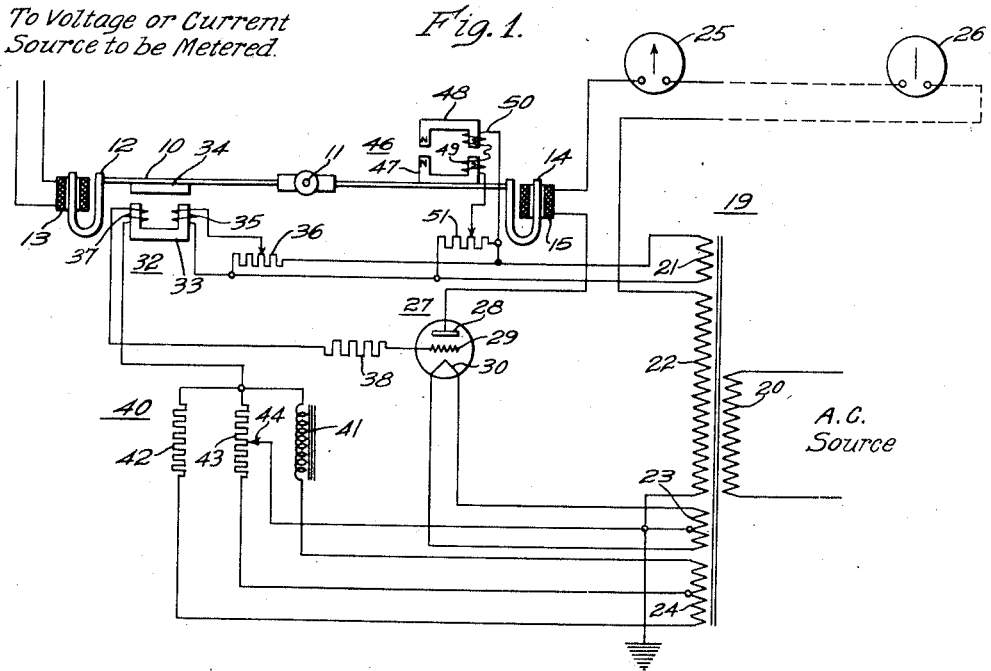

For a more complete understanding of the nature and scope of my invention, reference may be had to the following detailed description taken in connection with the accompanying drawings, in which Figure 1 illustrates diagrammatically a concrete embodiment of my invention.

Figure 2:
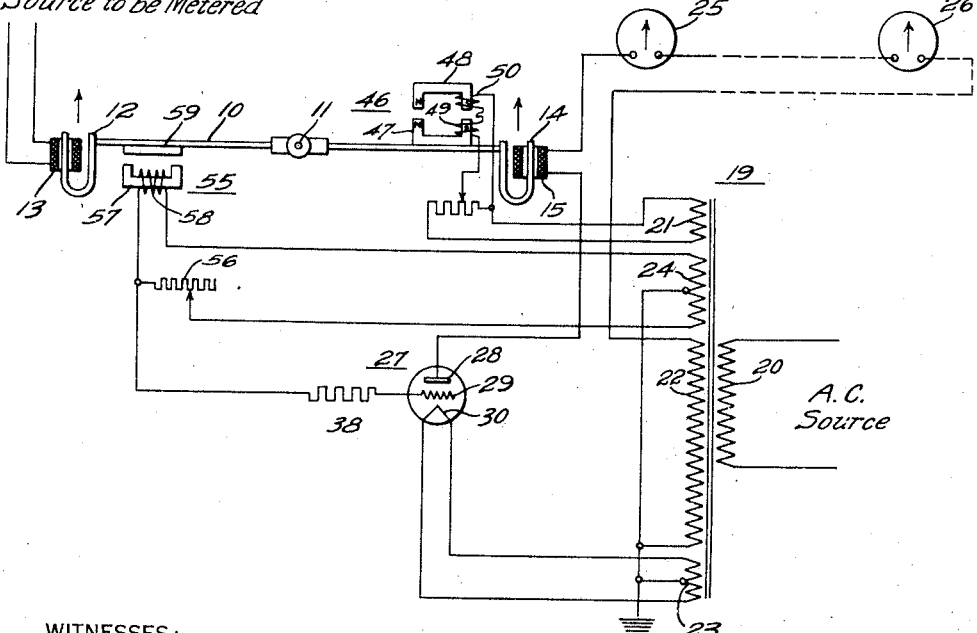
Figure 3:
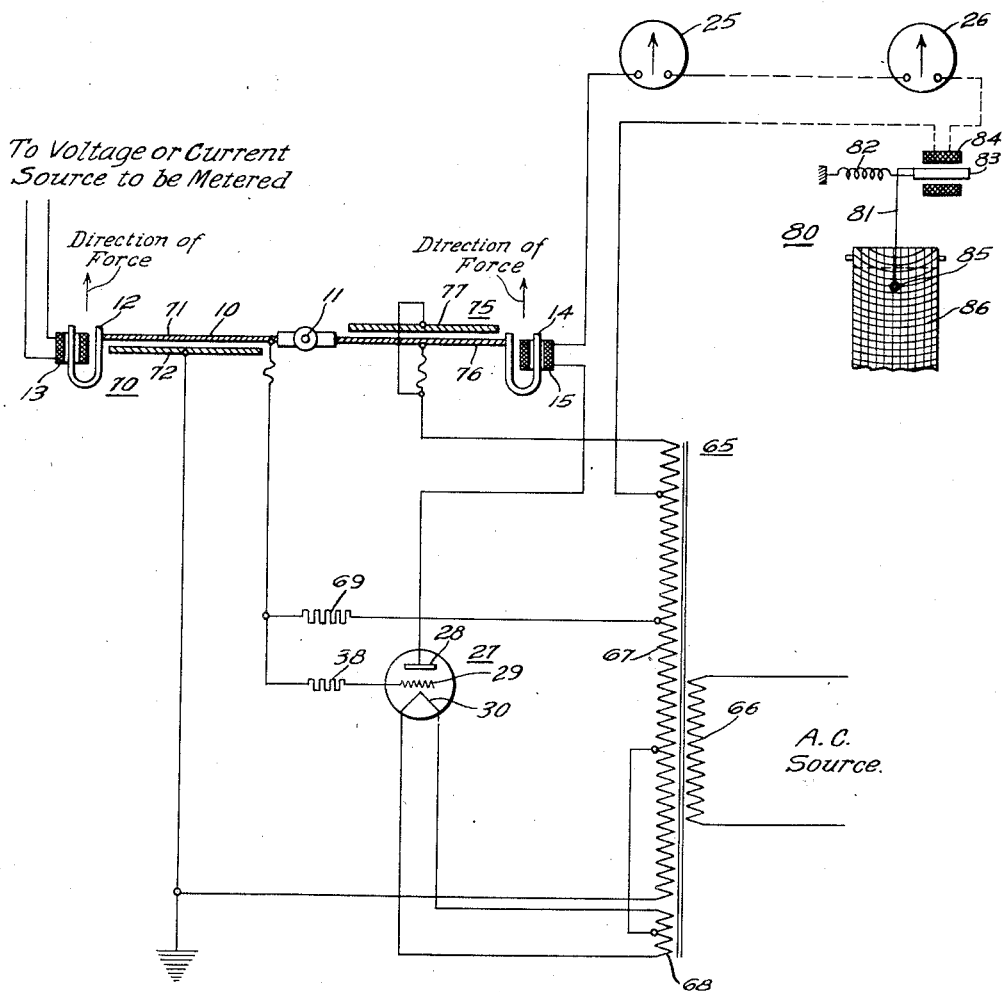

Figs. 2 and 3 illustrate diagrammatically modifications of the metering system illustrated in Fig. 1.

Referring now particularly to Fig. 1 of the drawings, the reference character 10 designates a balance arm which may be pivoted at 11. At the left-hand end of the balance arm 10 there is provided a U-shaped armature 12 around which is disposed a metering winding 13, which may be connected as indicated to the voltage or current source to be metered.

It will be understood that the metering winding 13 is arranged to generate, on flow of current therethrough, a magnetic field which will tend to cause the armature 12 to move and will correspondingly cause the balance arm 10 to be moved. While the invention has been illustrated in connection with a metering winding 13 which may be connected to a source of current or voltage, it will be understood that any other variable which will cause a corresponding movement of the balance arm 10 either mechanically or electrically may be employed. Therefore, it will be understood that the metering winding 13 is used merely for illustrative purposes.

The fundamental principle upon which my invention depends comprises restoring the balance arm 10 to a balanced position, such as that in which it is shown, after it has been moved from a position due to changes in current flow through the metering winding 13 and to measure the force necessary to restore the balance arm 10 to the balanced position, this force being a measure of the value of the quantity being measured. For this purpose I provide a second U-shaped armature 14 at the right-hand end of the balance arm 10, together with a balancing winding 15. In order to provide current for the balancing winding 15, a transformer, shown generally at 19, is employed having a primary winding 20 for connection to a source of alternating current and a plurality of secondary windings 21, 22, 23 and 24.

As illustrated, the current flowing through the balancing winding 15 may be measured by means of measuring devices such as ammeters 25 and 26 which may be connected in series circuit relation in the customary manner. It will be understood that the meter 25 may be located near the remaining part of the apparatus while the meter 26 may be located at some distance, for instance several miles, away from the remaining apparatus. It will be apparent that more than one meter 25 or 26 may be connected in series circuit relation with the balance winding 15 in order to obtain indication at as many points as may be desired.

In order to regulate the current flow through the balancing winding 15, a space discharge device 27 is provided having an anode 28, a grid 29 and a cathode 30. As illustrated, the anode 28 is connected to one terminal of the balancing winding 15, the other terminal of which is connected to the meter 25 which is connected in series circuit relation with the meter 26. The metering circuit is completed from meter 26 through the secondary winding 22 to the midpoint of the secondary winding 23 which is connected to the cathode 30.

It will be understood that the space discharge device 27 provides half wave rectification and that the direct current of this nature is caused to flow through the balancing winding 15 and the meters 25 and 26. The quantity of current permitted to flow through the space discharge device 27 and through the metering circuit to which it is connected, is controlled by varying the potential of the grid 29 with respect to the cathode 30 in a manner which will be described in detail herein. The variations in the potential applied to the grid 29, being proportional to the movement of the balance arm 10 from the balanced position in response to variations in the current flow through the metering winding 13, cause the space discharge device 27 to become more or less conducting to pass more or less current thereby restoring the balance arm 10 to a balanced position and to correspondingly change the quantity of current flowing through the meters 25 and 26.

In the embodiment illustrated in Fig. 1 of the drawings, a transformer shown generally at 32 is provided having a U-shaped core 33 which is juxtaposed to an armature 34 carried by the balance arm 10. A primary winding 35 is provided on the core 33 and is connected through a potentiometer 36 to the winding 21 of the transformer 19. A secondary winding 37 is provided on the core 33, one terminal of which is connected through a grid resistor 38 to the grid 29 while the other terminal is connected to a phase shifter circuit, shown generally at 40. As illustrated, the phase shifter circuit 40 comprises inductor 41 and a resistor 42 which are connected across the terminals of the winding 24 of the transformer 19. A potentiometer 43 is connected between the common terminals of the inductor 41 and the resistor 42 and the midpoint of the winding 24. As illustrated, the variable connection 44 to the potentiometer 43 is connected to the midpoint of the winding 23.

When the circuit between the grid 29 and the cathode 30 comprises the secondary winding 37 and a portion of the phase shifter circuit 40, it will be understood that the potential applied to the grid 29 is a combination of two potentials. The first of these potentials supplied by the secondary winding 37 will be in phase with the potential applied to the anode 28 while the second potential provided by the phase shifter 40 will be out of phase with this potential by an amount depending upon the position of the adjustable terminal 44 along the potentiometer 43. When the circuit including the phase shifter circuit 40 is employed, it will be understood that slight changes in the potential applied to the grid 29 by the secondary winding 37 will increase considerably the magnitude of effect caused thereby due to the fact that the percentage change in the grid potential will be considerably greater than if the phase shifter circuit 40 were not employed.

As the armature 34 approaches the core 33, the attractive forces therebetween will increase exponentially with the result that the balance arm 10 may be caused to oscillate considerably. In order to obviate this difficulty, a counterbalancing device, shown generally at 46 is provided comprising a pair of opposed U-shaped armatures 47 and 48. As illustrated, the armature 47 is carried by the balance arm 10 while the armature 48 is held in a fixed or stationary position. The armatures 47 and 48 are provided with windings 49 and 50 respectively, which are connected through a potentiometer 51 to the winding 21 of the transformer 19.

It will be observed that the windings 49 and 50 are so wound around the armatures 47 and 48 that at all times like poles are created at the opposing pole faces. Thus, as indicated, for a particular instant of time opposing north and south poles are provided at the pole faces. Since the law of attraction and repulsion between magnetic bodies is the same, it will be understood that the increasing attractive force between the armature 34 and the core 33, as the former is moved toward the latter, will be balanced by a correspondingly increasing repulsive force between the armatures 47 and 48. By means of the potentiometer 51, it is possible to adjust the degree of compensation as may be desired.

In operation, assuming that the current flowing through the metering winding 13 has increased, the forces applied to the balance arm 10 will no longer be balanced and it will move in a counterclockwise direction to move the armature 34 nearer to the core 33 thereby increasing the voltage induced in the winding 37 and causing a corresponding increase of potential to be applied to the grid 29. The current flowing through the space discharge device 27 will then be increased and the corresponding increased flow of current through the balancing winding 15 will tend to restore the balance arm 10 to a balanced position and the change in amount of current required to effect the restoration or balancing will be indicated by the meters 25 and 26. It will be observed that this current will be a function of the current flowing through the metering winding 13 and, therefore, on proper calibration, indications of the voltage or current being metered or any other suitable indications may be accurately obtained.

In the event that the current flow through the metering winding 13 decreases, a corresponding sequence of operations will be obtained in a reverse order.

Referring now particularly to Fig. 2 of the drawings it will be observed that the metering system there illustrated is similar to that shown in Fig. 1. For convenience, the winding 24 on the transformer 19 has been illustrated in a different location. With the exception of the circuit connections to the grid 29, however, the two systems are identical.

In the modification of the invention illustrated in Fig. 2 of the drawings, the transformer 32 and the phase shifter circuit 40 of Fig. 1 are omitted. In lieu thereof, a circuit comprising a variable inductor 55 and a variable resistor 56 is provided which is connected, as illustrated, to the secondary winding 24. The inductor 55 comprises a core 57 around which a winding 58 is disposed. An armature 59 carried by the balance arm 10 is provided for varying the inductance of the inductor 55. As illustrated, the grid 29 is connected through grid resistor 38 to the common connection between the resistor 56 and the winding 58 which are connected in series circuit relation.

On movement of the balance arm 10 from a balanced position, the inductive effect of the winding 58 is varied to correspondingly alter the phase relation of the potential applied to the grid 29. More or less current will correspondingly flow through the space discharge device 27 and through the balancing winding 15 to restore the balance in accordance with the description set forth hereinbefore. Corresponding indications will then be provided by the meters 25 and 26.

In Fig. 3 of the drawings, the potential of the grid 29 with respect to the cathode 30 of the space discharge device 27 is controlled by capacitor means rather than by inductor means as illustrated in the preceding figures. The metering and balancing circuits are essentially the same as described hereinbefore. However, the grid controlled circuit and the counter-balancing means are somewhat different.

A transformer, shown generally at 65, is provided having a primary winding 66 adapted to be connected to a source of alternating current and secondary windings 67 and 68. The secondary winding 67 is connected to supply current to the balance coil 15 and the meters 25 and 26 as rectified by the space discharge device 27.

In order to control the potential of the grid 29 with respect to the cathode 30, a resistor 69 is connected in series circuit relation with a variable capacitor 70, one plate 71 of which is shown as being formed by the left-hand end of the balance arm 10 and a second plate 72 which remains fixed. The grid 29 is connected to the common point between the resistor 69 and the variable capacitor 70.

When the balance arm 10 is moved in accordance with variations in current flow through the metering winding 13, the capacitance of the capacitor 70 will be changed accordingly with the result that the phase angle of the potential applied to the grid 29 will correspondingly be altered to cause the space discharge device 27 to conduct more or less current. As a result, the balance will be maintained by changes in current flow through the balancing winding 15 and the quantity being measured will be indicated by the meters 25 and 26.

Due to the fact that the plates 71 and 72 of the capacitor 70 will be oppositely charged, the attractive force therebetween will be considerably increased as they approach each other. This increase in attractive force may cause the balance arm 10 to oscillate, as will be readily understood, and, in order to compensate for this undesirable condition, a second variable capacitor shown generally at 75 is provided having one plate 76 indicated as being formed by the right-hand end of the balance arm 10 and a second plate 77 which is held fixed. Both of the plates 76 and 77 are connected together and to the upper terminal of the secondary winding 67 of the transformer 65. Therefore, like charges will appear on the plates 76 and 77 which will cause them to repel each other in an amount which will equal the increased attractive force between the plates 71 and 72 when they are moved toward each other. It will, therefore, be apparent that the forces tending to cause the balance arm 10 to oscillate will continually be balanced out and will be of no effect.

In the construction of any of the modifications of the invention set forth hereinbefore, it is desirable that the forces generated by the metering winding 13 and the balancing winding 15 be considerably in excess of the attractive and repulsive forces exerted by the transformer 32, Fig. 1, the inductor 55, Fig. 2, or the capacitor 70, Fig. 3.

In view of the fact that a current of from three to four amperes may be available in the metering circuit if certain space discharge devices 27 are used which are now available on the open market, it is possible to record graphically at the remote point variations in the quantity being measured. Because of the relatively large current available, the pen friction is negligible and an accurate record may be readily obtained.

As illustrated in Fig. 3 of the drawings, a graphic recording system is shown generally at 80. This system comprises an arm 81 which is provided with a spring 82 for biasing it in one direction and an armature 83 which, in conjunction with a winding 84 connected in series circuit relation with the metering circuit, opposes the action of the spring 82 and effects the movement of the arm 81 in accordance with the variations in the quantity being measured. A pen 85, carried by the arm 81, is caused to trace a curve in the customary manner on a chart 86 which is moved at a fixed rate relative to the pen 85.

Since certain further changes may be made in the above construction, and different embodiments of the invention may be made without departing from the scope thereof, it is intended that all matter contained in the above description or shown in the accompanying drawings shall be interpreted as illustrative and not in a limiting sense.

I claim as my invention:

1. A metering system comprising, in combination, a balance arm, means responsive to a quantity to be measured for moving said arm from a balanced position, variable reactive means mechanically connected to be responsive to the movement of said arm from said balanced position tending to restore it to said position, means responsive to said last named means for indicating the force necessary to restore said arm to the balanced position, and means for applying an increasing balancing force to said arm proportional to the movement thereof from the balanced position for counter-balancing the increasing forces tending to continue movement of the balance arm from the balanced position.

2. A metering system comprising, in combination, a balance arm, means responsive to a quantity to be measured for applying a force to move said arm from a balanced position, variable reactive means mechanically connected to be continually responsive to any movement of said arm from said balanced position tending to restore it to the balanced position by applying thereto a force proportional to the quantity being measured, and means for applying an increasing balancing force to said arm proportional to the movement thereof from the balanced position for counter-balancing the increasing forces tending to continue movement of the balance arm from the balanced position.

3. A metering system comprising, in combination, a balance arm, means responsive to a quantity to be measured for moving the balance arm from a balanced position, a winding disposed on energization to tend to effect movement of the balance arm, circuit means for connecting said winding to a source of alternating current, a space discharge device interposed in said circuit means, a grid in the discharge device, means continually responsive to any movement of the balance arm from a balanced position for correspondingly varying the potential applied to said grid to regulate the flow of current through the discharge device and thereby through said winding to tend to restore the balance arm to the balanced position, means for measuring the current flowing through said winding, and means for applying an increasing balancing force to said arm proportional to the movement thereof from the normal position for counter-balancing the increasing forces tending to continue movement of the balance arm from the balanced position.

4. A metering system comprising, in combination, a balance arm, means responsive to a quantity to be measured for moving the balance arm from a balanced position, a winding disposed on energization to tend to effect movement of the balance arm, circuit means for connecting said winding to a source of alternating current, a space discharge device having an anode, a cathode and a grid interposed in said circuit means, said grid and cathode being connected to said source of alternating current, means for varying the phase angle of the potential applied to said grid in accordance with the movement of the balance arm from a balanced position for correspondingly regulating the flow of current through the discharge device and thereby through said winding to tend to restore the balance arm to the balanced position, means for measuring the current flowing through said winding, and means for applying an increasing balancing force to said arm proportional to the movement thereof from the balanced position for counter-balancing the increasing force tending to continue movement of the balance arm from the balanced position.

5. A metering system comprising, in combination, a balance arm, means responsive to a quantity to be measured for moving the balance arm from a balanced position, a winding disposed on energization to tend to effect movement of the balance arm, circuit means for connecting said winding to a source of alternating current, a space discharge device having an anode, a cathode, and a grid interposed in said circuit means, said grid and cathode being connected to said source of alternating current, a variable inductor connected between said grid and cathode, the inductance of said inductor being variable in accordance with the movement of the balance arm from a balanced position for correspondingly varying the potential applied to said grid to regulate the flow of current through the discharge device and thereby through said winding to tend to restore the balance arm to the balanced position, means for measuring the current flowing through said winding, and a counter-balancing device to compensate for the increasing force of said inductor tending to continue movement of the balance arm from the balanced position comprising a pair of opposed armatures, one stationary and the other carried by the balance arm, and a winding on each armature connected to said alternating current source and disposed to create poles of like polarity in opposition to each other on said armatures.

6. A metering system comprising, in combination, a balance arm, means responsive to a quantity to be measured for moving the balance arm from a balanced position, a winding disposed on energization to tend to effect movement of the balance arm, circuit means for connecting said winding to a source of alternating current, a space discharge device having an anode, a cathode, and a grid interposed in said circuit means, said grid and cathode connected to said source of alternating current, a transformer having a primary winding connected to the alternating current source and a secondary winding, a phase shifter circuit connected in series circuit relation with said secondary winding and the combination interposed between the grid and cathode, means for varying the induction between said primary and secondary windings in accordance with the movement of the balance arm from a balanced position for correspondingly varying the potential applied to said grid to regulate the flow of current through the discharge device and thereby through said winding to tend to restore the balance arm to the balanced position, means for measuring the current flowing through said winding, and a counter-balancing device to compensate for the increasing force of said transformer tending to continue movement of the balance arm from the balanced position comprising a pair of opposed armatures, one stationary and the other carried by the balance arm, and a winding on each armature connected to said alternating current source and disposed to create poles of like polarity in opposition to each other on said armatures.

7. A metering system comprising, in combination, a balance arm, means responsive to a quantity to be measured for moving the balance arm from a balanced position, a winding disposed on energization to tend to effect movement of the balance arm, circuit means for connecting said winding to a source of alternating current, a space discharge device having an anode, a cathode and a grid interposed in said circuit means, said grid and cathode being connected to said source of alternating current, a variable capacitor connected between said grid and cathode, the capacitance of said capacitor being variable in accordance with the movement of the balance arm from a balanced position for correspondingly varying the potential applied to said grid to regulate the flow of current through the discharge device and thereby through said winding to tend to restore the balance arm to the balanced position, means for recording the current flowing through said winding, and a counter-balancing device to compensate for the increasing force of the variable capacitor tending to continue movement of the balance arm from the balanced position comprising a second variable capacitor having a stationary section and a corresponding section carried by the balance arm, said sections being connected to said alternating current source to be charged to the same potential.

JOHN W. DAWSON.